United States Patent Office 3,223,613
Patented Dec. 14, 1965

3,223,613
WAX COATING COMPOSITION
John Podlipnik, Palos Heights, Hallard C. Moyer, Homewood, and Arnold L. Guttman, Chicago, Ill., assignors, by mesne assignments, to Sinclair Research, Inc., New York, N.Y., a corporation of Delaware
No Drawing. Filed Aug. 8, 1961, Ser. No. 130,190
4 Claims. (Cl. 208—21)

This invention relates to a new wax composition particularly useful in the manufacture of wax-coated paperboard containers.

Wax compositions have found increasingly extensive use in recent years for coating paper and paperboard materials as, for instance, milk and juice cartons. In certain of these applications it has become highly desirable that the wax composition meet the following requirements: (a) It should result in a smooth, satin coating completely free of striations or serpentine when applied to the paperboard container at about 155 to 160° F. and cooled at about 40 to 60° F.; (b) it should result in good surface coverage both on the inside and outside of the container; (c) the coating should have satisfactory resistance to cracking due to thermal shock, i.e. it should not crack when the coated paperboard is plunged into ice water at 32 to 34° F.; (d) the wax composition should have a maximum viscosity at 155° F. of 55 SUS; (e) there should be no objectionable dropping out of suspended material when the wax is held in storage at 150 to 160° F. for thirty days; (f) there shall be no objectionable build-up of wax on the metal parts of waxing machines.

Heretofore, attempts toward the formulation of a wax composition that meets all of the above requirements have failed. For example, blending of certain wax components designed to meet one or more of the requirements quite often has been found to create additional or adverse effects upon other desirable properties so that the wax composition fails one or more of the other requirements. A particularly severe problem, for example, has been meeting the serpentine-free requirement without producing wax composition of excessive viscosity that leaves excessive wax build-up on machine parts.

We have now discovered a wax composition containing a plurality of wax components of defined properties which, when combined in particular proportions, provide a product that meets all of the above requirements. Each component of our composition makes its contribution to the end product in such a way that it does not adversely affect physical and functional properties fundamentally contributed by the other components and is apparently able to do this because of its particular properties, defined concentrations and the relationship it holds to the combination of all the components.

The novel wax composition of our invention is comprised essentially of about 59 to 81.5% paraffin wax, about 10 to 25% high viscosity isoparaffin-naphthenic wax, about 7.5 to 15% of a low viscosity isoparaffin wax and about .75 to 1.25% high melting microcrystalline wax. These percentages are by weight. This composition can be applied to paperboard containers by any manner known to the art as for example by dipping the container in a vat of the melted wax composition, for instance maintained at a temperature of about 150 to 170° F., withdrawing the coated containers from the vat and cooling in air. Paperboard presently employed in the packaging industry such as sized and calendered paperboard produced by the Fourdrinier process and having a low moisture content, i.e. about 5%, is an example of the base material that can form the wax coating.

The paraffin wax component is the base wax of our composition as it comprises about 59 to 81.5% of the blend and is preferably a fully refined paraffin wax, i.e. essentially tasteless and odorless and contains a maximum of about 1.0% oil (ASTM D721-56T). The paraffin wax component has a melting point (ASTM D87-57) in the range of about 130 to 145, a viscosity SUS at 210° F. (ASTM D446-53) of about 42 maximum and includes about 15 to 35% by weight of a paraffin wax having a melting point in the range of about 145 to 160° F. (ASTM D87-57), a viscosity SUS at 210° F. (ASTM D446-53) of about 43 to 50 and a penetration at 77° F. (ASTM D1321-57T) of about 10 to 20. This wax is predominantly n-paraffinic but contains appreciable isoparaffins and alkyl cycloparaffins. The remaining waxes which may be employed as the balance of the paraffin wax component of our composition are the essentially straight chained crystalline paraffin waxes obtained from paraffin containing crude petroleum oils such as Mixed Base crudes. The high melting point paraffin wax (i.e. about 145 to 160° F. melting point paraffin wax) included in the paraffin wax component of the present invention can be obtained independently, if desired, for instance from a heavy lubricating oil distillate fraction (boiling range about 800–1050° F. at atmospheric pressure) and then blended with a lower boiling paraffin wax obtained, for example, from light (boiling range about 650–825° F. at atmospheric pressure) and medium lubricating oil distillates to give the defined paraffin wax component of the present invention.

The high viscosity isoparaffin-naphthenic wax component of our composition is a flexible, low melting point, non-normal paraffin-type wax present, for instance, in heavy lube distillate slack wax. This wax can be obtained by conventional solvent deoiling of a foots oil fraction obtained during the solvent deoiling of a heavy lube distillate slack wax for the production of higher melting point paraffin waxes such as the wax fraction of about 145–160° F. melting point included in the paraffin wax component of our composition. The foots oil wax thus obtained is characterized by a high viscosity for its low melting point, a soft and pliable nature and an exceptionally low temperature flexibility. Listed below are the approximate requirements which are met by an isoparaffin-naphthenic wax satisfactory for use in the composition of the present invention:

Molecular weight (average) _____ 450 min.
Melting point, ASTM D87-57 _____ 105–120° F.
Viscosity at 210° F. SUS, ASTM D446-53 _____ 42–50.
Oil content, ASTM D721-56T _____ 2.0 max.
Refractive index at 80° C. _____ 1.4400 min.
Penetration at 77° F. (ASTM D1321-57T) _____ 40–100.

This wax, while crystalline in nature, usually contains roughly equal amounts of isoparaffins and alkyl cycloparaffins with a minor (e.g. about 10–20%) amount of n-paraffins; as determined by mass spectrometer, gas chromatography and $n$, $d$, M ring analysis of material fractionated by urea treating.

The concentration of the isoparaffin, naphthenic wax component in the novel wax composition is between about 10 and 25% by weight. Addition of higher percentages would unduly soften the wax resulting in poor scuff resistance and objectionable feel and appearance. This would also lead to objectionable wax build-up on machine parts. Concentrations of less than 10% by weight are ineffective.

The low-viscosity isoparaffin wax component of our composition is a wax relatively rich in isoparaffins (branched chain paraffins) falling within the $C_{23}$–$C_{34}$ range. The isoparaffin content of the wax will vary depending on the specific nature of the crude oil from which it is obtained and the specific conditions used in its preparation but will ordinarily be greater than about 10% by weight, generally about 10–50% by weight or more with at least about 90% by weight of the isoparaffins falling within the $C_{23}$–$C_{34}$ range (as determined by gas chromatography). Cycloparaffins (naphthenes) may be but are not necessarily present in this wax component. The wax has a melting point of up to about 115° F., preferably about 105–110° F. and a refractive index at 80° C. of 1.4235 minimum. The viscosity of this wax should be in the range of about 35–40 SSU/210. The n-paraffinic content that is often present in the wax should be predominantly less than $C_{25}$ and greater than $C_{20}$ in order neither to unduly interfere with the effect of the isoparaffins nor unduly soften the wax.

An isoparaffinic wax of this second type suitable for use in the composition of the present invention can be conveniently prepared from waxy distillates or a portion thereof, used in the preparation of the paraffin wax base component. However, only the light lube distillates and medium lube distillates result in a satisfactory product. The slack wax from such distillates is usually subjected to two or three deoiling operations to produce the predominant paraffin wax portion of the paraffin wax component of the present invention. The filtrate product from the first of these deoilings is segregated and further processed to yield the desired isoparaffin wax. This processing consists essentially of subjecting the first filtrate, or first foots oil, to an additional solvent deoiling operation under such conditions that substantially all of the oil is removed and the desired low-melting isoparaffinic waxes remain. Oil content remaining in the isoparaffinic wax should be low—no more than about 2.0% as measured by ASTM D721–56T. Filtrates from the second deoiling of the slack wax are unsatisfactory. The isoparaffin content of the wax will normally be in the range of about 10–50% or more but may be further increased if desired, for example, by treating the wax with urea or by removing additional n-paraffins by solvent fractionation. The isoparaffin wax component is added to our composition in concentrations of at least about 7.5 up to about 15% by weight. At least 7.5% by weight of this isoparaffin wax component is required to completely eliminate striations or serpentine effect. Concentrations above about 15% by weight result in an objectionable oily, greasy feel.

The microcrystalline wax component of our composition is a high-melting point wax which can be prepared by the solvent fractionation of petrolatum from a Mid-Continent crude oil. A number of different grades are currently marketed but those having the following approximate properties will give the desired results:

Melting point (ASTM D127–40) _____ 180–200° F.
Penetration at 77° F. (ASTM D1321) ___ 2–8.
Viscosity SSU at 210° F.
 (ASTM D446–53) _____ 100 max.

A preferred microcrystalline wax is tank bottoms microcrystalline wax obtained by the refining of material that settles out of crude oil during storage and having the following approximate properties:

Melting point (ASTM D127–49) _____° F__ 180–200
Penetration at 77° F., 100 gms.
 (ASTM D1321–57T) _____ 2–5
Viscosity, SSU at 210° F. (ASTM D446–53) ____ 60–90

The concentration of the microcrystalline wax component of our composition is about 0.75–1.25% by weight. At this concentration, the microcrystalline wax does not completely eliminate striations or serpentine. Higher concentrations would do so, but they result in poor surface coverage, particularly on inked areas. This poor surface coverage is not due to the presence of striations but rather to the presence of "dry spots" where surfaces of the paperboard are not covered with wax. This leads to excessive bulging and development of soft, raggy cartons when they are filled and stored. This problem is overcome by the addition of the second or low viscosity isoparaffin component of our composition. Thus to obtain a coating completely free of striations or serpentine, the low-viscosity isoparaffin wax component and the microcrystalline wax component of the present invention should both be present.

An important characteristic of our wax composition is that no objectionable dropping out of suspended material occurs in plant storage at 150–160° F. such as occurs with blends containing, for example, polyethylene. To preclude any settling of material, the blend should be first heated to at least 190° F. and then pumped into storage. Since the cloud point of the blend is less than 145° F., no settling will occur.

Other ingredients may be added to our wax composition in minor amounts so long as they do not unduly deleteriously affect the ultimate desired properties of the wax composition. These additional ingredients may be, for example, other microcrystalline waxes having high-compatibility as indicated by a needle penetration of greater than about 15, defoamers, anti-oxidants, etc. Such microwaxes often have a melting point of about 130 to 175° F. (ASTM D127–49). The maximum concentration of additional microcrystalline waxes should be about 4% by weight.

The invention will be further illustrated by the following specific examples.

EXAMPLE I

By conventional vacuum distillation of a Mid-Continent crude, a waxy light lube distillate was prepared having a 10–90% distillation range of 650–825° F. at 760 mm. pressure. This distillate was dearomatized by conventional phenol treating and dewaxed to produce +10° F. pour point oil by conventional solvent dewaxing by low temperature precipitation from methyl ethyl ketone-toluene solution. The resultant slack wax was subjected to two successive solvent deoiling steps, using conventional methyl ethyl ketone-toluene deoiling, at 50° F. temperatures to produce a first foots oil, a second foots oil, and a hard, oil-free n-paraffinic wax of 130° F. melting point designated as Base A. The second foots oil, containing principally n-paraffins with some isoparaffins and occluded oil was retained for further processing. The first foots oil, containing occluded oil, low melting n-paraffins and a relatively high percentage of waxy iso-paraffins, was subjected to conventional solvent deoiling at 10° F., resulting in a foots oil product which was rejected, and a wax of 110° F. melting point rich in waxy, low melting, isoparaffinic compounds. This foots wax designated as Foots Wax A was relatively free of occluded oil, testing only 1.5% oil by ASTM D721–56T.

EXAMPLE II

Another component wax was prepared by processing a waxy medium lube distillate, similar in source to that of Example I and having a 10–90% distillation range of 750–900° F. Techniques described in Example I were used to produce a hard, highly n-paraffinic wax of 143° F. melting point designated as Base B. Here again the second foots oil stream was retained. The first foots oil stream was rejected.

EXAMPLE III

A waxy heavy lube distillate similar in sorce to that of Example I but having a 10–90% distillation range of 800–1050° F. was processed using the same techniques and sequence used in Example I to produce a hard, oil-free wax of 152.5° F. melting point designated as Base C. The two foots oils produced were combined and solvent deoiled at 10° F. to produce a rejected oily filtrate and a substantially oil free Foots Wax B of 119.4 melting point rich in both isoparaffins and naphthenic (cycloalkanes) paraffins.

EXAMPLE IV

The second foots oil streams from Examples I and II were blended in equal amounts and solvent deoiled at 10° F. to give a rejected oil filtrate and a substantially oil free Foots Wax C of 120.5° F. melting point. Foots Wax C contained appreciable isoparaffinic as well as n-paraffinic wax content, but was not found suitable for eliminating striations as will be illustrated below.

EXAMPLE V

Base waxes A and B were combined with base wax C and used as the base paraffin wax component in the final formula. A preferred formula is a blend of Bases A, B, and C containing 50 parts of A, about 17 parts of B and about 33 parts of C. This blend was designated Base D. (Either Base A or Base B can be eliminated, if desired, replacing one with the other, as long as sufficient low viscosity material is retained to keep viscosity of the finished product within the desired limits.)

The composition and pertinent properties of the various component waxes are summarized in Table I below.

tom edge. Each bottom is then cut into rectangular-shaped halves. The three samples are dipped into the wax blend at 155° F. for 10 seconds holding the carton section in the upright position. Enough of the wax is drained to leave a substantial fillet along the long bottom edge. The coated carton specimen is then set on a wire rack in a tilted position so as to maintain the fillet and air cooled at room temperature for a minimum of two hours. Three more samples are then dipped and drained in the same manner as above.

The fillet edge of each specimen is held in contact with 60–70° F. water until the wax is set up. The samples are then aged for a minimum of two hours, at room temperature. The aged samples are then dipped in 32° F. water for 15 seconds and the number of cracks are counted and rated as follows:

| Cracks: | Ratings |
|---|---|
| 0 | 0 |
| 1–2 | 1 |
| 3–4 | 2 |
| Over 4 | 3 |

0 rating is preferred; 1 is acceptable; 2 and 3 are rejected.

In the Wax Dip Coating Test cut panels from cartons

*Table I*

TESTS ON WAX COMPONENTS

|  | M.P., °F., ASTM D87-57 | Percent Oil, ASTM D721-56T | Viscosity at 210° F. (SUS), ASTM D446-53 | Penetration at 77° F., ASTM D1321-57T | Refractive Index at 80° C. | Isoparaffin Content |
|---|---|---|---|---|---|---|
| Base A | 129.2 | 0.11 | 37.0 | 9 | 1.42665 | |
| Base B | 143.2 | 0.0 | 40.4 | 8 | 1.43030 | |
| Base C | 153.2 | 0.51 | 47.3 | 15 | 1.4364 | |
| Base D [1] | 139.5 | 0.20 | 40.0 | 10 | | |
| Foots Wax A | 112.0 | 0.96 | 35.5 | | 1.42600 | [2] 30 |
| Foots Wax B | 119.4 | 1.46 | 48.4 | 54 | 1.44070 | |
| Foots Wax C | 123.0 | 0.09 | | 15 | 1.42930 | |
| Tank Bottoms Microwax | [3] 197.5 | | 75.0 | 7 | | |

[1] Blend of 50 parts Base A, 17 parts Base B, 33 parts Base C.
[2] At least 90% by weight falls in the $C_{23}$–$C_{34}$ range.
[3] ASTM 127-49.

EXAMPLE VI

Various finished wax blends were prepared by combining the component waxes and filtering the blends through activated bauxite to remove traces of colored or odorous impurities. Composition and properties of the blends are summarized in Table II below. The wax blends were then subjected to the Thermal Shock Test and the Carton Panel Wax Dip Coating Test.

In the Thermal Shock Test, the bottoms of three fiberboard milk cartons are cut off one-half inch above the botused for the Thermal Shock Test are trimmed and preheated at 180° F. for 10 minutes. The samples are taken from the oven and dipped immediately into the test wax at 155° F. and held there for 10 seconds. The samples are then removed and the wax film allowed to solidify in air. When the wax sets up, the sample is dipped into 60–70° F. water. The strips are then examined for gloss, orange peel and serpentine. Smooth, uniform, continuous coatings pass, others fail.

The results are shown in Table II below.

*Table II*

| Finished Wax No. | 1 | 2 | 3 | 4 | 5 | 6 | 7 |
|---|---|---|---|---|---|---|---|
| Composition, Wt. Percent: | | | | | | | |
| Base A | 100 | | | | 72.0 | | |
| Base B | | 100 | | | | 72.0 | |
| Base C | | | 100 | | | | |
| Base D [1] | | | | 100 | | | 82.0 |
| Foots Wax A | | | | | 10.0 | 10.0 | |
| Foots Wax B | | | | | 17.0 | 17.0 | 17.0 |
| Foots Wax C | | | | | | | |
| Tank Bottoms Microwax | | | | | 1.0 | 1.0 | 1.0 |
| Polyethylene (2000 Mol. Wt.) | | | | | | | |
| Microcrystalline Wax (170° F. Melting Pt.) | | | | | | | |
| Monsanto PC-1344 Foam Inhibitor p.p.m. | | | | | | | |
| BHT Oxidation Inhibitor p.p.m. | | | | | | | |
| Properties: | | | | | | | |
| Viscosity at 155° F., SUS | 42.5 | | 83.0 | | | | 52.0 |
| Thermal Shock Value | 3 | 3 | 2 | 3 | 0 | 0 | 0 |
| Dip Strip Striation Rating | Heavy | Heavy | Moderate | Heavy | Moderate | Moderate | Slight |
| Wax Coverage: | | | | | | | |
| Open Label [2] | | | | | | | Good |
| Closed Label [3] | | | | | | | Do. |
| Coating Appearance | | | | | | | Smooth. |
| Coating Feel | | | | | | | Dry, chalky. |

See footnotes at end of table.

Table II.—Continued

| Finished Wax No | 8 | 9 | 10 | 11 | 12 | 13 |
|---|---|---|---|---|---|---|
| Composition, Wt. Percent: | | | | | | |
| Base A | | | | | | |
| Base B | | | | | | |
| Base C | | | | | | |
| Base D [1] | 81.7 | 77.0 | 72.0 | 65.0 | 77.15 | 70.0. |
| Foots Wax A | | 5.0 | 10.0 | | 5.0 | 9.6. |
| Foots Wax B | 17.0 | 17.0 | 17.0 | 17.0 | 17.0 | 16.4. |
| Foots Wax C | | | | 17.0 | | |
| Tank Bottoms Microwax | 1.3 | 1.0 | 1.0 | 1.0 | 0.75 | 1.0. |
| Polyethylene (2000 Mol. Wt.) | | | | | 0.10 | |
| Microcrystalline Wax (170° F., Melting Pt.) | | | | | | 3.0. |
| Monosanto PC-1344 Foam Inhibitor, p.p.m | | | | | | 25. |
| BHT Oxidation Inhibitor, p.p.m | | | | | | 10. |
| Properties: | | | | | | |
| Viscosity at 155° F., SUS | 52.0 | 51.6 | 51.5 | 51.4 | 51.8 | 52.5. |
| Thermal Shock Value | 0 | 0 | 0 | 0 | 0 | 0. |
| Dip Strip Striation Rating | None | Trace | None | Slight | None | None. |
| Wax Coverage: | | | | | | |
| Open Label [2] | Good | Good | Good | Good | Good | Good. |
| Closed Label [3] | Poor | do | do | do | Poor | Do. |
| Coating Appearance | Smooth | Smooth | Smooth | Smooth | Smooth | Smooth. |
| Coating Feel | Dry, chalky | Plastic | Plastic | Dry, chalky | Plastic | Plastic. |

[1] Blend of 50 parts Base A, 17 parts Base B, 33 parts Base C.
[2] About 25% of surface area is inked.
[3] About 85% of surface area is inked.

As illustrated in Table II none of the base waxes by themselves are suitable due to poor resistance to thermal shock, presence of a striated coating, or too high viscosity. Neither are base waxes A and B suitable when combined with the foots waxes and A and B and tank bottoms microwax. However, these base waxes (A and B) can be used in improved compositions when combined with base wax C. Blends 10 and 13 illustrate compositions which fully meet all of the requirements previously listed.

Blends 5 and 6 illustrate the unsuitability of base waxes A or B even when used with foots waxes A and B and tank bottoms microwax. Blend 7 with the preferred base wax D shows that satisfactory resistance to thermal shock can be obtained by addition of the soft, flexible foots wax component B, but this formula is not completely free of striations. Increasing tank bottoms microwax, completely eliminates striations (blend 8), but this adversely affects coverage of heavily inked (closed label) cartons. Blend 9 illustrates that inclusion of 5% foots wax A is insufficient to completely eliminate striations. Blend 11 illustrates that another foots wax, foots wax C, does not eliminate striation. Blend 12 shows that addition of as little as 0.10% polyethylene adversely affects coverage on the closed label cartons.

We claim:
1. A wax composition consisting essentially of about 59 to 81.5 weight percent of a paraffin wax component having a melting point in the range of about 130–145° F., a viscosity at 210° F. (SUS) of about 42 maximum, said paraffin wax component including about 15 to 35 weight percent of a paraffin wax fraction having a melting point in the range of about 145 to 160° F., a viscosity at 210° F. (SUS) of about 43 to 50 and a penetration at 77° F. of about 10 to 20; about 10 to 25 weight percent of a high viscosity isoparaffin-naphthenic wax having a melting point in the range of about 105 to 120° F., a viscosity at 210° F. (SUS) of about 42 to 50, an average molecular weight of about 450 minimum, a refractive index at 80° C. of about 1.4400 minimum and a penetration at 77° F. of about 40 to 100; about 7.5 to 15 weight percent of a low viscosity isoparaffin wax having a melting point up to about 115° F. containing greater than 10 weight percent isoparaffins at least about 90% by weight of which are within the $C_{23}$–$C_{34}$ range and having a refractive index at 80° C. of about 1.4235 minimum, and a viscosity at 210° F. (SUS) of about 35 to 40; and about .75 to 1.25 weight percent of a microcrystalline wax having a melting point in the range of about 180 to 200° F., a penetration at 77° F. of about 2–8 and a viscosity at 210° F. (SUS) of 100 maximum.

2. The composition of claim 1 wherein the melting point of the low viscosity isoparaffin wax component is in the range of about 105 to 110° F.

3. The composition of claim 1 wherein the microcrystalline wax is a tank bottoms microcrystalline wax.

4. The composition of claim 3 to which is added up to 4% of a microcrystalline wax having a melting point in the range of about 130 to 175° F.

References Cited by the Examiner

UNITED STATES PATENTS 2,985,538   5/1961   Padgett et al. _____ 208—21

ALPHONSO D. SULLIVAN, *Primary Examiner.*

DANIEL E. WYMAN, *Examiner.*